(12) United States Patent
Haney et al.

(10) Patent No.: US 12,209,446 B2
(45) Date of Patent: Jan. 28, 2025

(54) MULTIPLE AXIS ADJUSTABLE PIVOT BEARING ASSEMBLY COMPRISING A FLOOR MOUNT ASSEMBLY

(71) Applicant: 3B Industries, Inc., Comanche, OK (US)

(72) Inventors: David A. Haney, Duncan, OK (US); Johnny W. Brown, Jr., Comanche, OK (US); William W. Brown, Comanche, OK (US)

(73) Assignee: 3B Industries, Inc., Comanche, OK (US)

( * ) Notice: Subject to any disclaimer, the term of this patent is extended or adjusted under 35 U.S.C. 154(b) by 0 days.

(21) Appl. No.: 18/244,788

(22) Filed: Sep. 11, 2023

(65) Prior Publication Data

US 2024/0084632 A1 Mar. 14, 2024

Related U.S. Application Data

(63) Continuation of application No. 18/244,192, filed on Sep. 8, 2023.

(Continued)

(51) Int. Cl.
*E05D 7/00* (2006.01)
*E05D 7/081* (2006.01)
(Continued)

(52) U.S. Cl.
CPC ......... *E05D 7/0045* (2013.01); *E05D 7/0009* (2013.01); *E05D 7/0027* (2013.01);
(Continued)

(58) Field of Classification Search
CPC ...... F16C 35/02; F16C 23/02; F16C 2350/54; E05D 7/081; E05D 7/0045; E05D 7/0054;
(Continued)

(56) References Cited

U.S. PATENT DOCUMENTS 842,520 A * 1/1907 Brothers ............... E05D 7/0423
16/241
3,137,891 A * 6/1964 Rudnick ................. E05D 7/081
16/243

(Continued)

FOREIGN PATENT DOCUMENTS

CN 206844904 U * 1/2018
EP 2682552 A2 1/2014
(Continued)

OTHER PUBLICATIONS

International Search Report and Written Opinion for PCT App No. PCT/US2023/032357 dated Dec. 21, 2023, 14 pgs.

*Primary Examiner* — Jeffrey O'Brien
(74) *Attorney, Agent, or Firm* — Procopio, Cory, Hargreaves & Savitch LLP

(57) ABSTRACT

An adjustment system comprising: a pivot nut comprising a pivot nut aperture feature configured to accept the lower portion of a pivot bolt; a floor mount having a slot in which the pivot nut is slidingly engaged so as to have a movement including forward-backward, side-to-side and rotational, the floor mount having a floor mount aperture that aligns with the pivot nut aperture; and a cover configured to mount over the floor mount and engage with the pivot nut so as to move with the pivot nut.

12 Claims, 19 Drawing Sheets

Related U.S. Application Data

(60) Provisional application No. 63/405,053, filed on Sep. 9, 2022.

(51) Int. Cl.
   *F16C 11/04* (2006.01)
   *F16C 17/04* (2006.01)

(52) U.S. Cl.
   CPC .............. *E05D 7/081* (2013.01); *F16C 11/04* (2013.01); *F16C 17/04* (2013.01); *E05Y 2900/132* (2013.01); *F16C 2350/54* (2013.01)

(58) Field of Classification Search
   CPC .... E05D 2007/0063; E05D 2007/0072; E05D 7/0009; E05D 7/0018
   See application file for complete search history.

(56) References Cited

U.S. PATENT DOCUMENTS

| | | | | |
|---|---|---|---|---|
| 3,584,332 | A * | 6/1971 | Taylor | E05D 15/266 16/245 |
| 3,683,453 | A * | 8/1972 | McLeland | E05D 7/081 16/248 |
| 3,895,412 | A * | 7/1975 | Johnson | E05D 7/081 16/244 |
| 4,142,272 | A * | 3/1979 | Oogami | E05D 7/0423 16/245 |
| 4,646,472 | A * | 3/1987 | Sugawara | E05F 1/123 16/75 |
| 4,677,707 | A * | 7/1987 | Holler | E05D 7/081 16/385 |
| 4,999,876 | A * | 3/1991 | Nass | E05D 7/04 16/236 |
| 5,054,163 | A * | 10/1991 | Sterling | E05D 7/0027 16/244 |
| 5,239,728 | A * | 8/1993 | Redman | E05D 7/0027 16/244 |
| 5,689,855 | A * | 11/1997 | Tang | E05D 7/0054 16/242 |
| 7,429,032 | B2 * | 9/2008 | Stull | E05F 1/1215 256/73 |
| 7,490,384 | B2 * | 2/2009 | Lee | E05D 7/0027 16/244 |
| 7,617,567 | B2 * | 11/2009 | Franchini | E05D 7/04 16/382 |
| 8,528,169 | B1 * | 9/2013 | Yu | E05D 7/043 16/238 |
| 9,605,457 | B2 * | 3/2017 | Humble | E05D 7/04 |
| 9,644,411 | B2 * | 5/2017 | Gompper | E05D 7/0054 |
| 9,739,523 | B1 * | 8/2017 | Augsburger | E05D 3/02 |
| 10,316,561 | B2 * | 6/2019 | Barker | E05D 7/1022 |
| 10,330,370 | B2 * | 6/2019 | Choi | A47F 3/043 |
| 10,604,979 | B2 * | 3/2020 | Bacchetti | E05D 5/0246 |
| 10,982,475 | B2 * | 4/2021 | Iwata | E05D 7/04 |
| 11,208,835 | B2 * | 12/2021 | Su | E05F 1/00 |
| 11,603,689 | B2 * | 3/2023 | Dries | E05F 5/02 |
| 11,781,359 | B2 * | 10/2023 | Bacchetti | E05D 7/081 16/277 |
| 11,834,882 | B2 * | 12/2023 | Eccleston | E05D 7/081 |
| 2004/0025296 | A1 * | 2/2004 | Wade | E05D 11/02 16/273 |
| 2006/0123598 | A1 * | 6/2006 | Park | E05F 3/225 16/378 |
| 2006/0231218 | A1 * | 10/2006 | Liang | E05D 15/26 160/206 |
| 2013/0154464 | A1 * | 6/2013 | Fiori | E05D 7/0423 16/303 |
| 2017/0198507 | A1 * | 7/2017 | Humble | E05D 7/04 |
| 2020/0131819 | A1 * | 4/2020 | Iwata | E05D 7/04 |
| 2023/0374834 | A1 * | 11/2023 | Herreman | E05D 7/081 |

FOREIGN PATENT DOCUMENTS

| | | | |
|---|---|---|---|
| JP | 08199892 A | 8/1996 | |
| JP | 10008814 A | 1/1998 | |
| WO | WO-2024094711 A1 * | 5/2024 | ........... E05D 7/0423 |

* cited by examiner

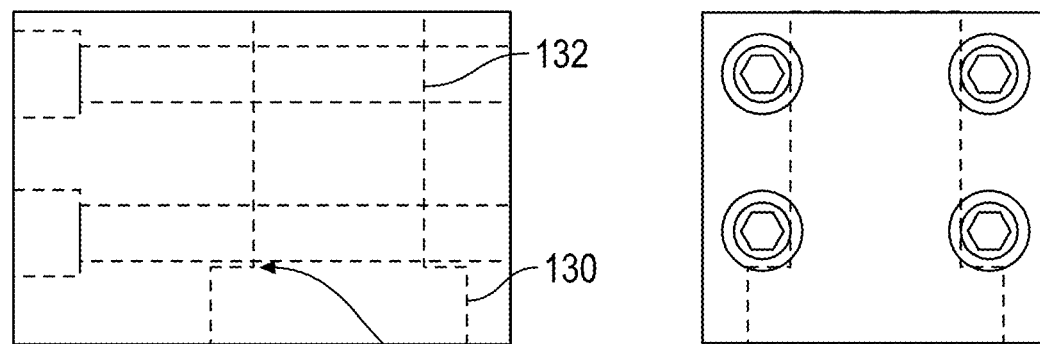
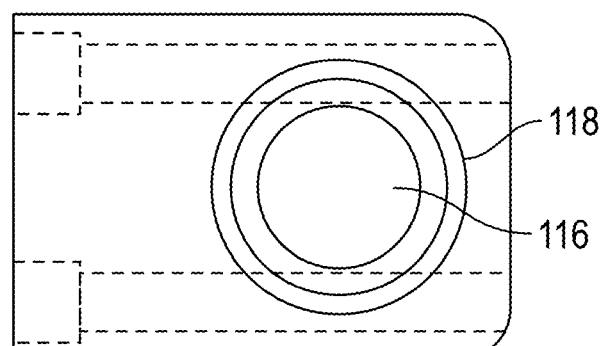
FIG. 9

MULTIPLE AXIS ADJUSTABLE PIVOT BEARING ASSEMBLY COMPRISING A FLOOR MOUNT ASSEMBLY

CROSS REFERENCE TO RELATED APPLICATIONS

This application is a continuation application of U.S. patent application Ser. No. 18/244,192, filed Sep. 8, 2023, which claims priority of U.S. Provisional Patent Application No. 63/405,053, filed Sep. 9, 2022. All of the contents of which are incorporated herein by reference in their entirety.

FIELD OF THE DISCLOSURE

The present disclosure relates generally to assemblies used to adjust mounted structures such as windows and doors. More specifically, this disclosure relates to assemblies that allow for the adjustments of mounted structures with respect to multiple axes.

BACKGROUND OF THE DISCLOSURE

Industries related to mounted structures, such as doors, gates and windows, have a need for being able to make adjustments in orientation, placement and height of such mounted structures. For example, in the ballistic door field, the installation of high-level solid glass doors is inhibited by problems related to adjusting the door when misalignment occurs. A typical ballistic door carrying a UL8 (Underwriter's Laboratory Level 8) rating might be four by eight feet and 1 1/16 inches (27 mm) thick. Such a door can assert approximately 800 to 1000 psi on its lower hinge structure. Existing hardware for such doors cannot withstand such pressure and be adjusted or compensate for variations in the substructure when being installed. Additionally, such prior hardware does not allow the doors to be adjusted once installed, except by the disassembly and removal of the door from the building structure. Because of the weight and difficulty of handling the doors, such adjustments are prohibitive, time and labor intensive and expensive.

SUMMARY OF THE DISCLOSURE

According to one aspect, an adjustment system comprising: a pivot nut comprising a pivot nut aperture feature configured to accept the lower portion of a pivot bolt; a floor mount having a slot in which the pivot nut is slidingly engaged so as to have movement, simultaneous or otherwise, including forward-backward, side-to-side and rotational, the floor mount having a floor mount aperture that aligns with the pivot nut aperture; and a cover configured to mount over the floor mount and engage with the pivot nut so as to move with the pivot nut.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

FIG. 9 is an illustration of a sample pivot mount block requisite to be used with the adjustment-pivot unit of this disclosure.

DETAILED DESCRIPTION OF THE DISCLOSURE

Figure 1:
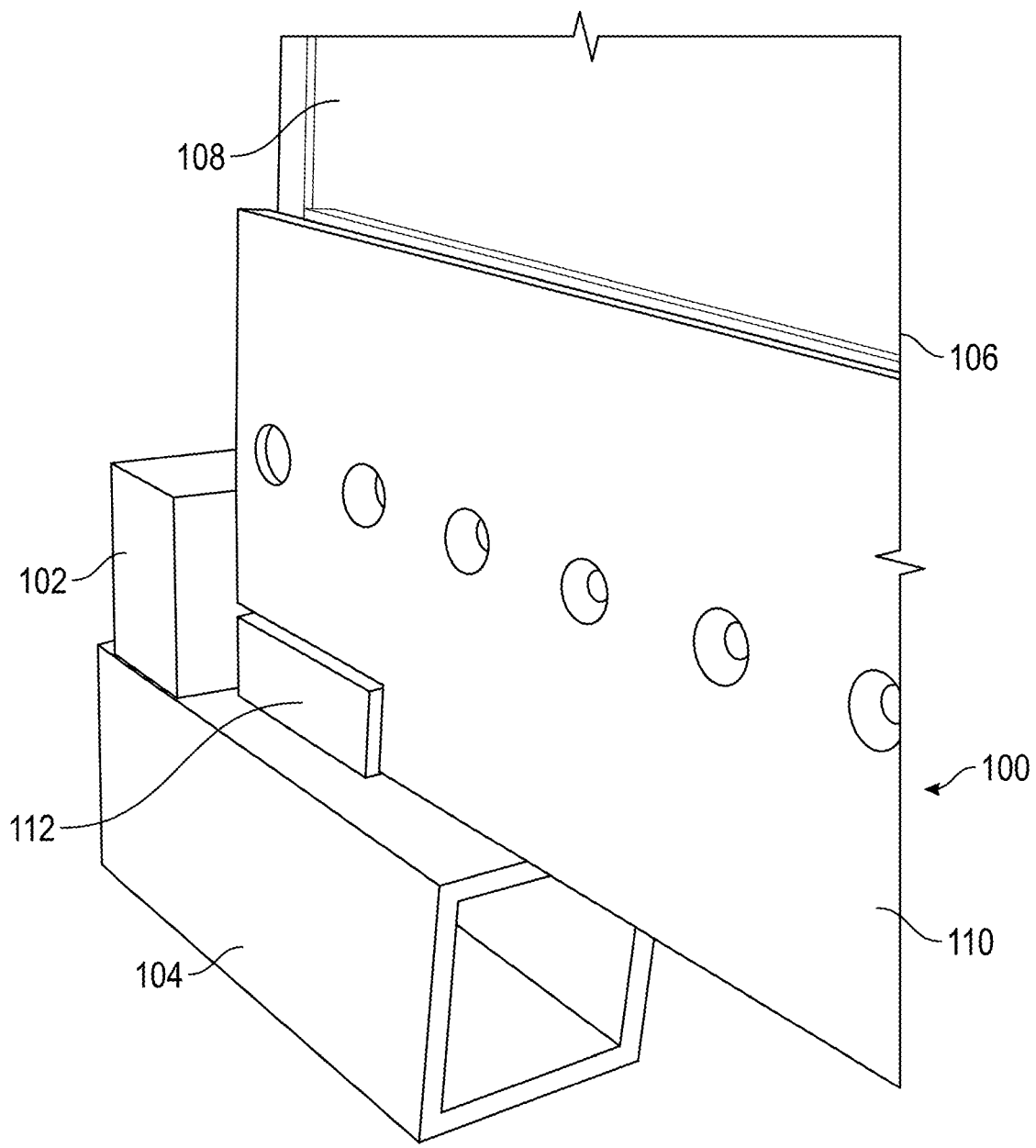
FIG. 1 is an illustration of a system utilizing an adjustable mounting system in accordance with the current disclosure. The system of FIG. 1 is a test system representative of a door mounted for use.

This disclosure concerns mounted structures such as windows and doors. While the embodiments will generally be described in terms of doors, those skilled in the arts will readily discern applications to other mounted structures. Numerous specific details are set forth in order to provide a thorough understanding of the embodiments described herein. However, those of ordinary skill in the art will understand that the embodiments described herein can be practiced without these specific details. In other instances, methods, procedures and components have not been described in detail so as not to obscure the related relevant feature being described.

The description in this disclosure will refer to and be better understood when reviewed in conjunction with the appended figures. It should be understood that the embodiments are not limited to the precise arrangements and instrumentalities shown. Further, the components in the drawing(s) are not necessarily to scale, emphasis instead is placed upon clearly illustrating the principles of the present invention. Moreover, in the drawings, like reference numerals designate corresponding parts throughout the several views This disclosure is directed at installation hardware that allows such doors to be adjusted such as to compensate for variations in the substructure during installation, and to later be adjusted to compensate for shifting or changes in substructure. Specifically, embodiments of this disclosure allow for multi-axis adjustments to be made efficiently and easily in an economical and efficient manner. For example, multi-axis adjustments include x-axis (left and right), y-axis (forward and backward), z-axis (up and down) and/or a-axis (rotational) adjustments.

When an item is referred to as being a "feature" it typically and preferably will be integrally formed in or on another item such as by molding or machining. However, in some applications it might be attached by welding or by another fix securement, though generally this is less preferred.

Turning now to FIG. 1, a mounting structure 100 is shown with a representation of a wall 102, floor 104 and door 106 that is mounted via the mounting structure comprising a frame 110, which as explained below can be clamp system for securing the glass, and a lower hinge mounting system 112. The door 106 can be a ballistic glass door comprising glass 108. Lower hinge mounting system 112 is an adjustable mounting system as further described below. In an actual door system there should also be at least an upper frame component or upper clamp (not shown), and there would be an upper hinge mounting system (not shown). While such an upper hinge mounting system can also be an adjustable mounting system as described below, this is typically not necessary. As such, upper hinge mounting systems will often be a conventional hinge.

Lower hinge mounting system 112 will also be referred to herein as adjustable mounting system 112. Turning now to FIGS. 2 to 14 the components of the adjustable mounting system 112 are illustrated.

Figure 2:
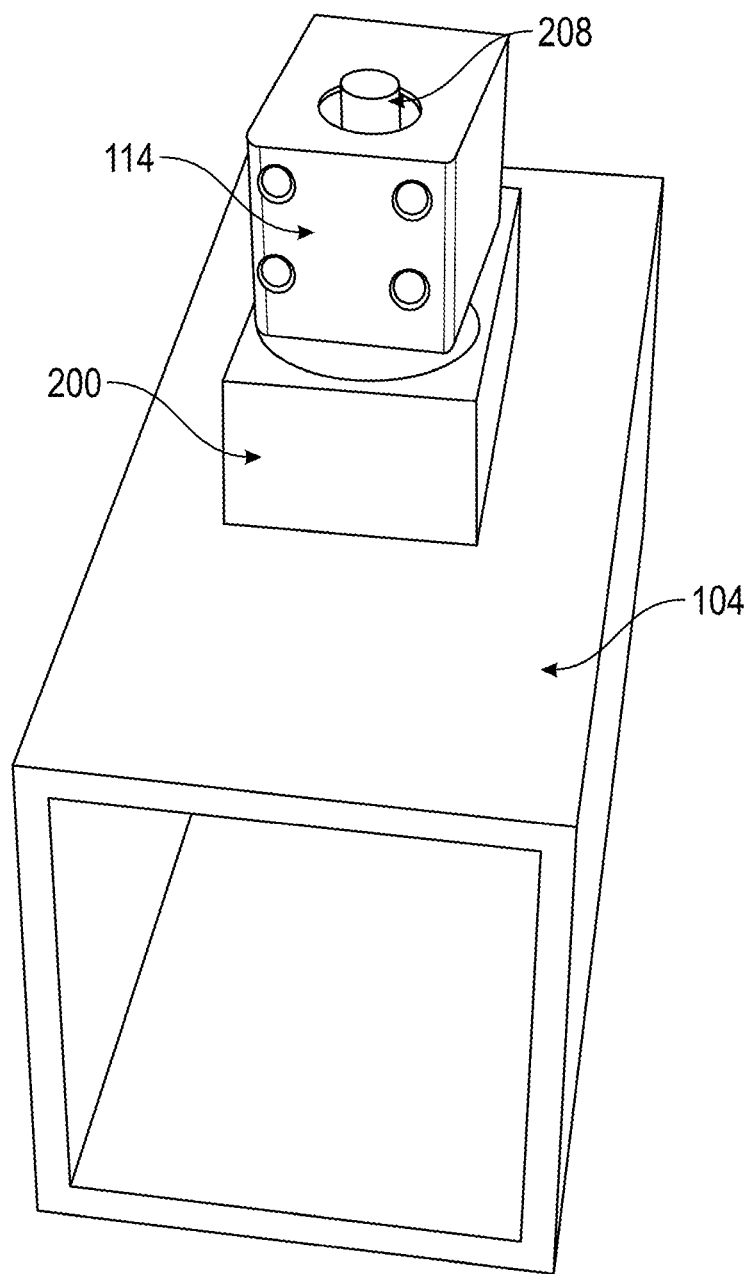
FIG. 2 is an illustration of an adjustable mounting system in accordance with some embodiment of this current disclosure.
Figure 3:
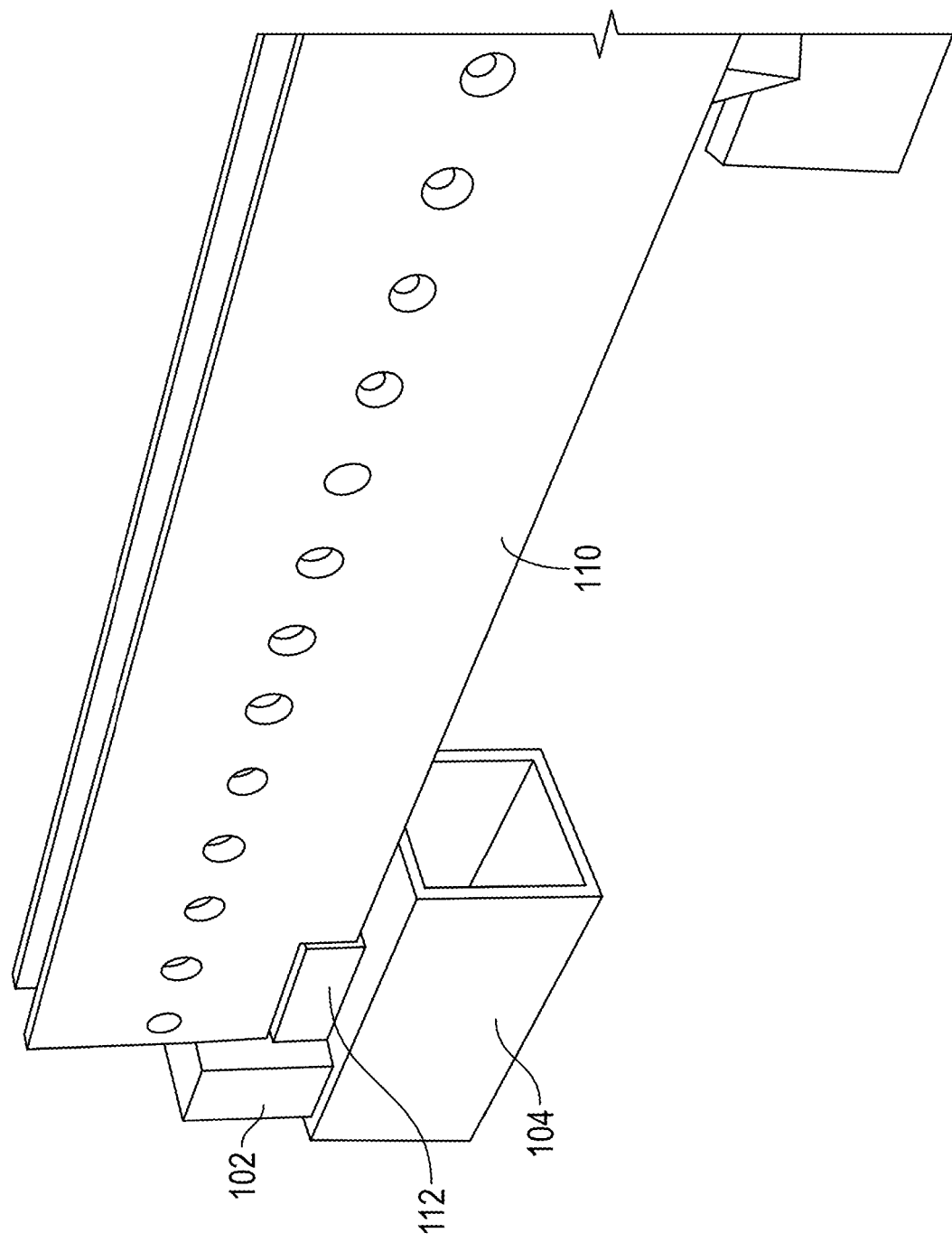
FIG. 3 is an illustration of the door frame pivoted to the closed position.
Figure 4:
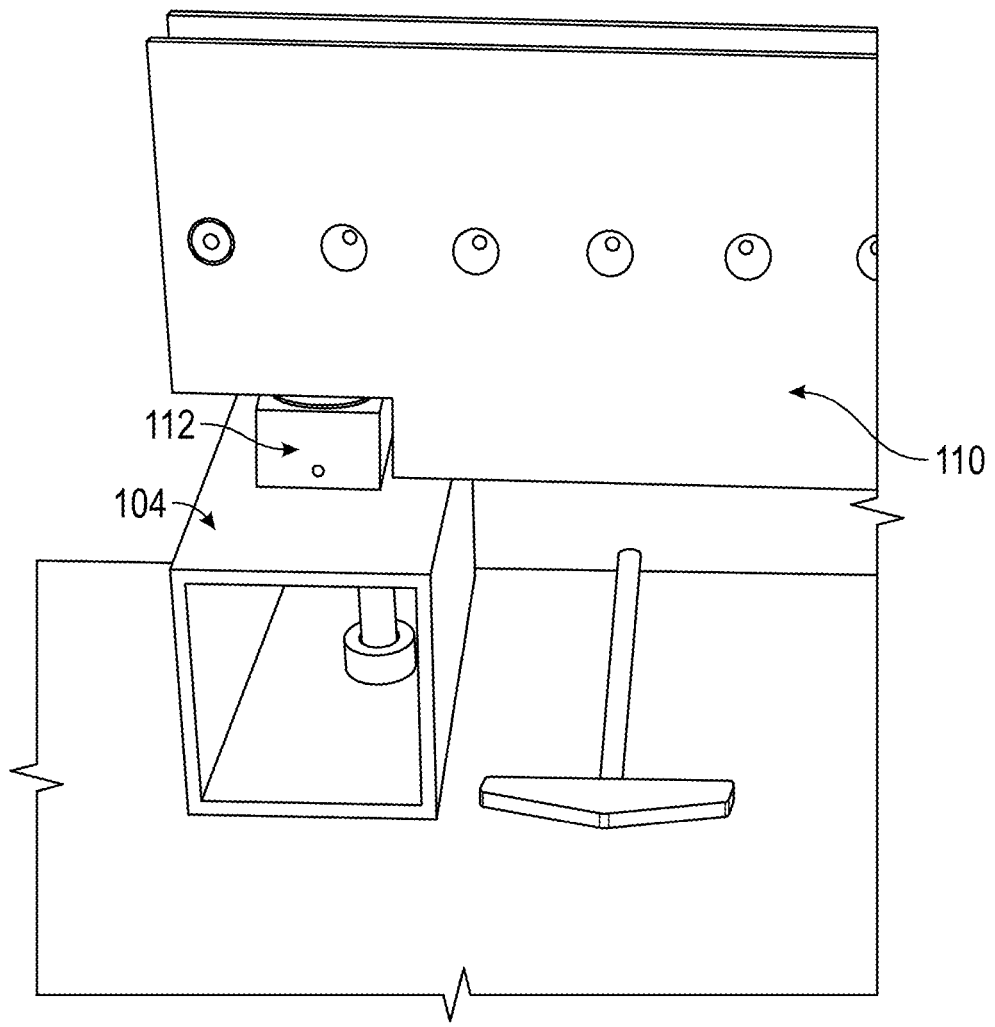
FIG. 4 is an illustration of the door frame pivoted to the open position.

As illustrated in FIG. 2, pivot mount block 114 is pivotally mounted over adjustment-pivot unit 200. Pivot mount block 114 is designed to be attached to and support the door frame 110. The pivotal mounting is accomplished by means of pivot bolt 208 as will further become apparent from the below description. The pivotal mounting provides for the door 106 to pivot from a closed position in FIG. 3 to an open position in FIG. 4.

Figure 5:
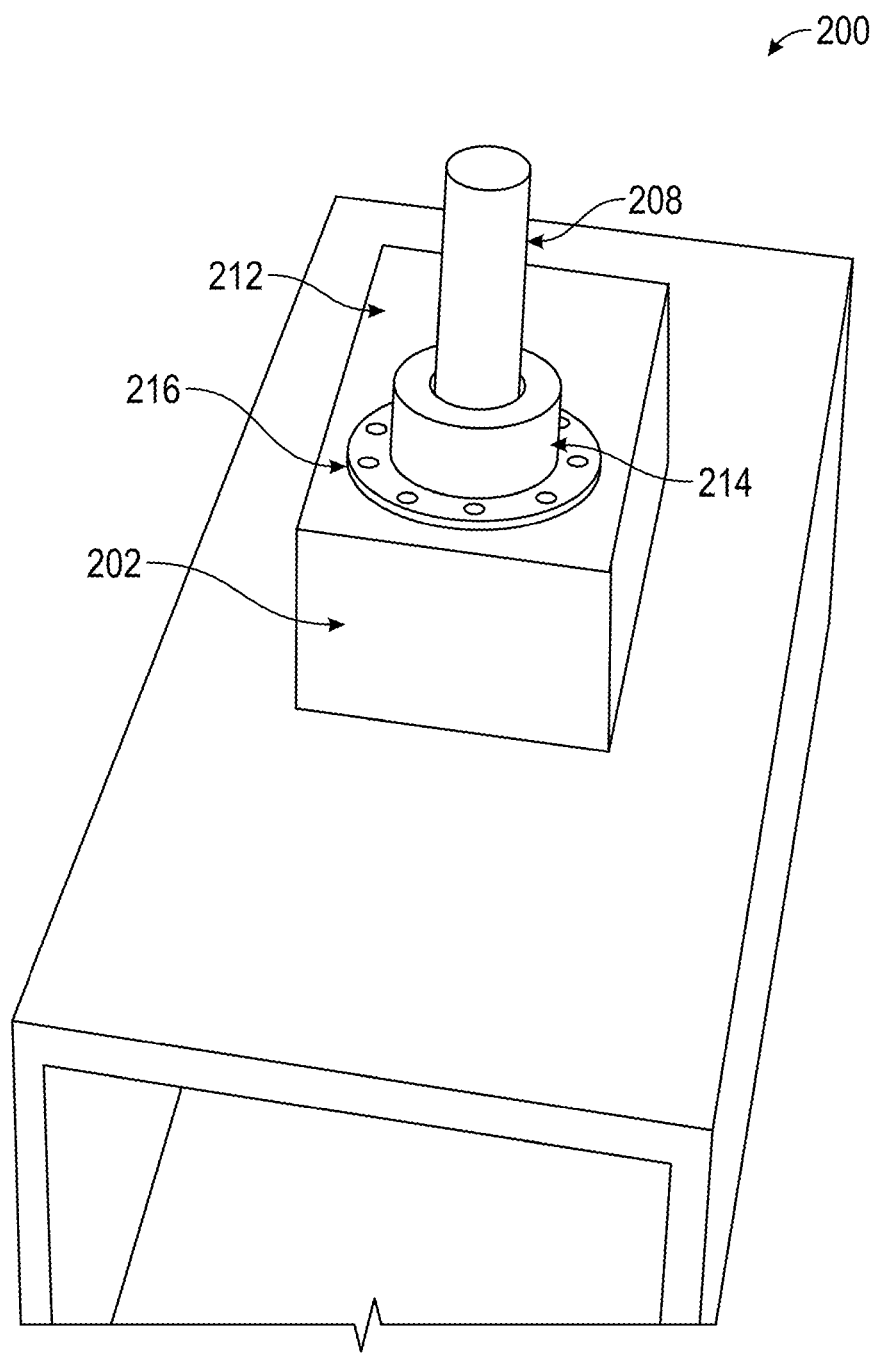
FIG. 5 is an illustration of an adjustment-pivot unit in accordance with some embodiments of this current disclosure.
Figure 6:
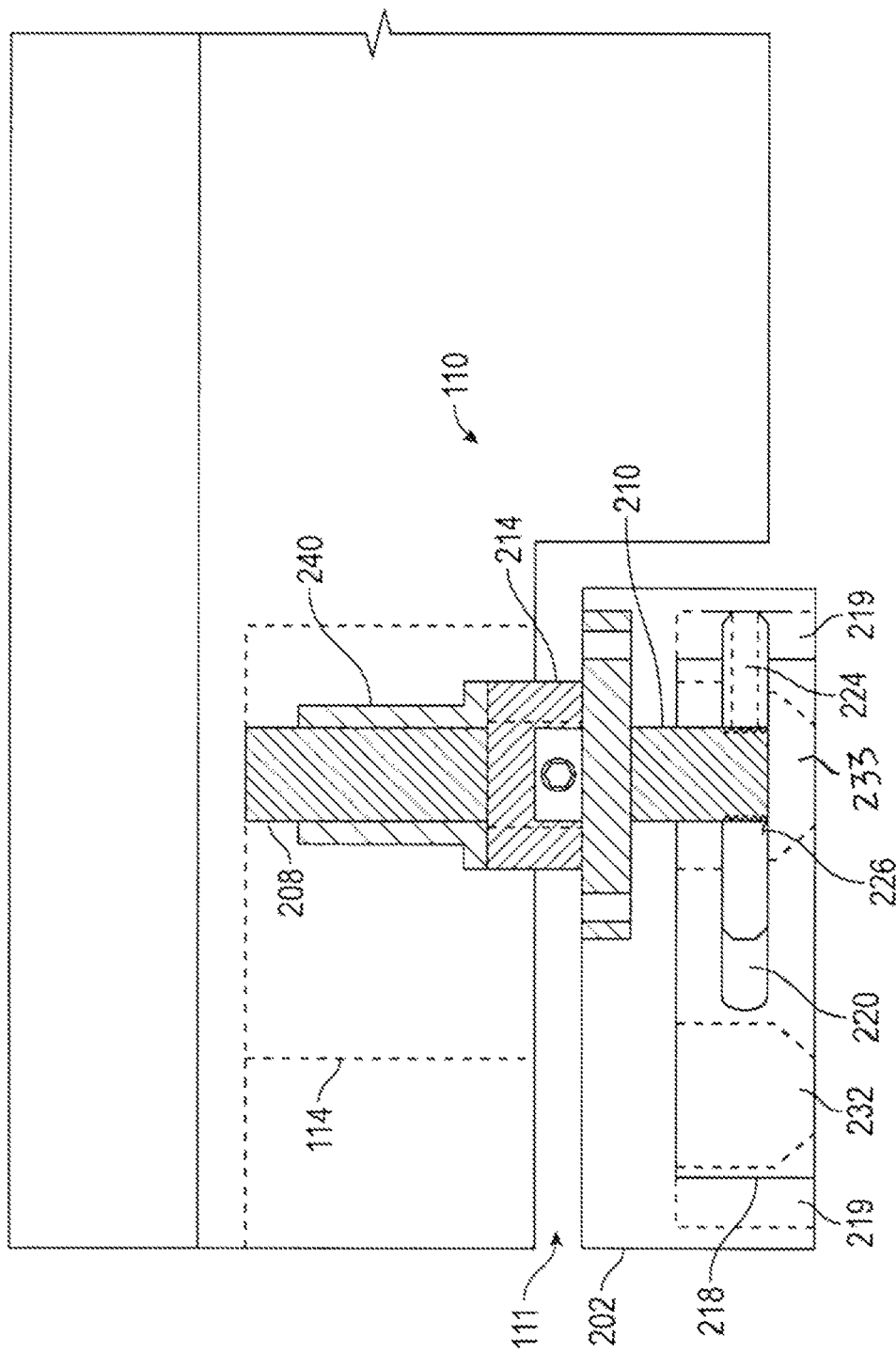
FIG. 6 is a schematic illustration of the adjustment-pivot unit and its connection to the pivot mount block and door frame.

As illustrated in FIGS. 5 and 6, adjustment-pivot unit 200 has pivot cover 202, pivot bolt 208, and pivot height-adjustment nut 214. Within pivot cover 202 is pivot floor mount 218 and pivot square nut 224, configured to be positioned into a slot 220 within pivot floor mount 218. Pivot square nut 224 can then comprise a threaded interface 226 to receive the lower end 210 of pivot bolt 208. Pivot floor mount 218 can then be mounted to the floor via, e.g., bolts installed in holes 232 and 233. Once the lower end 210 of pivot bolt 208 is tightened down in pivot square nut 224, then pivot bolt will be fixedly engaged with pivot floor mount 218. FIGS. 11-14 illustrate the pivot floor mount 218 and pivot square nut 224 in more detail.

Figure 7:
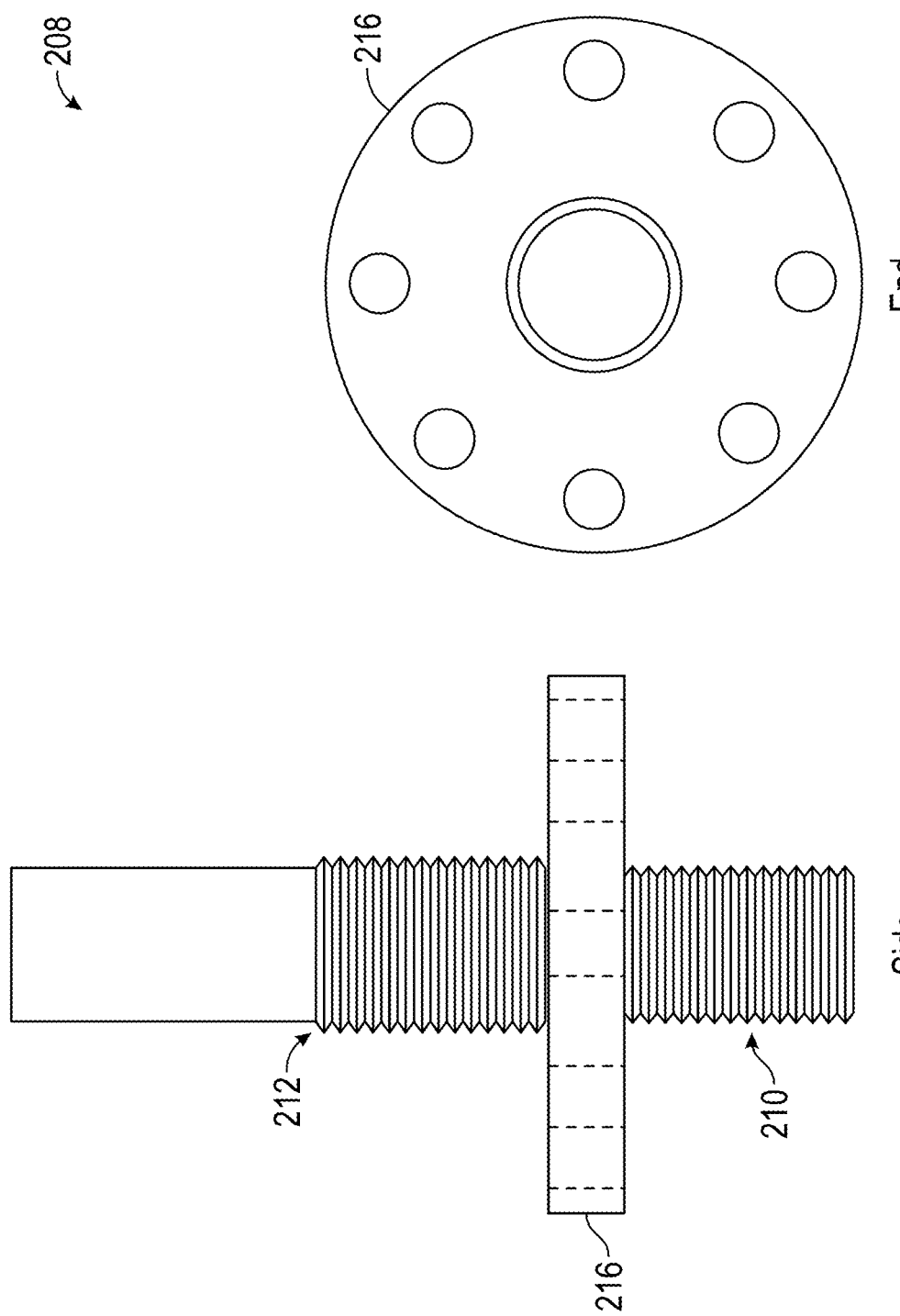
FIG. 7 is an illustration of a pivot bolt with an integrated disk feature disk in accordance with this disclosure.
Figure 8:
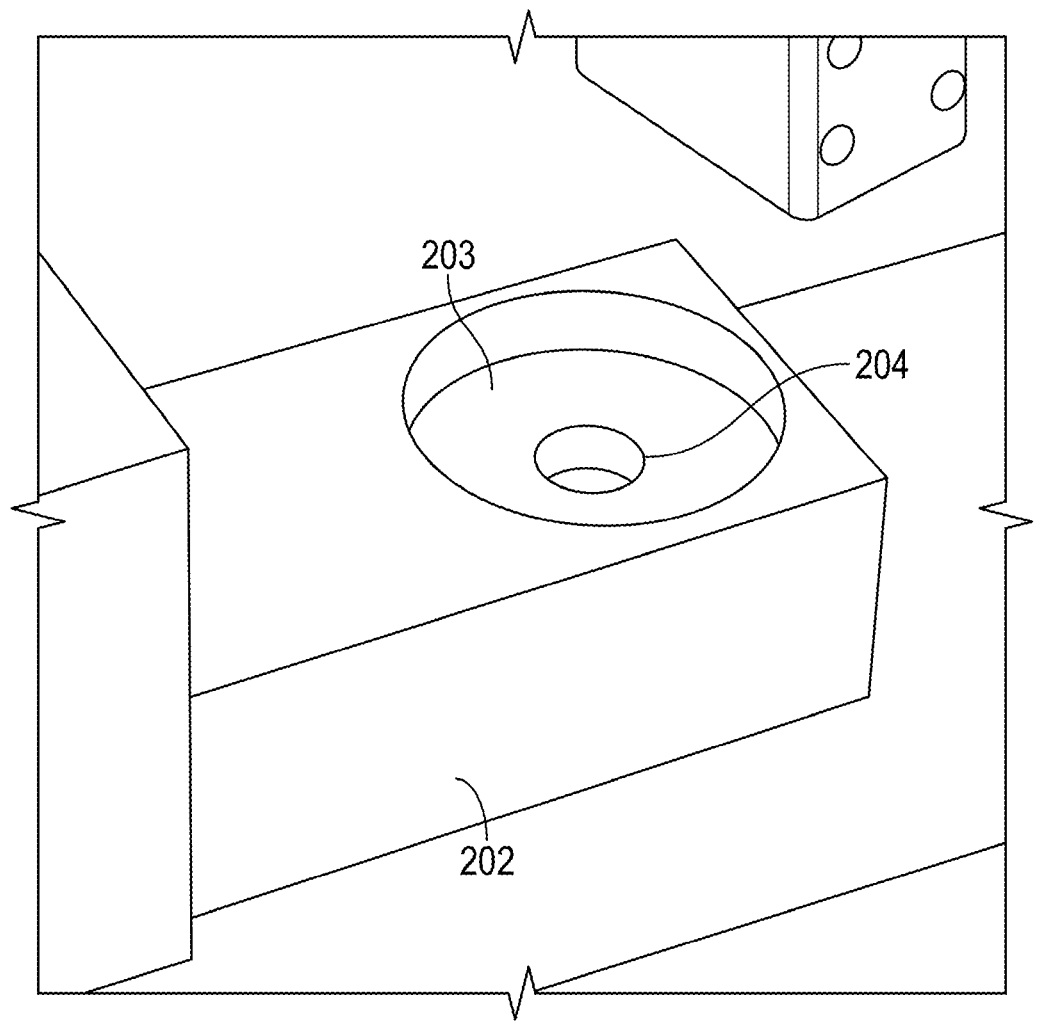
FIG. 8 is an illustration of a pivot cover in accordance with some embodiments.

As best seen from FIGS. 6, 7 and 8, pivot bolt 208 has pivot disk feature 216 integrally machined into the part thereto so that rotation of pivot disk feature 216 rotates pivot bolt 208, allowing it to engage the threaded interface of lower end 210 with pivot square nut 224. When unit 200 is assembled, pivot disk feature 216 rests on the recess feature 203 above and extending through aperture feature 204 of pivot cover 202 and extends upward therefrom so that it is accessible through gap 111 between pivot mount block 114 and pivot cover 202. A tool such as a spanner wrench can be used to tighten pivot bolt 208 into square nut 224. A flat spanner wrench allows access to pivot disc feature 216 via gap 111. A washer can rest in recess feature 203 depending on the embodiment.

The mounting of pivot block 114 can be best seen from FIGS. 6, 7 and 9. When assembled with pivot mount block 114, pivot height-adjustment nut 214 is above pivot disk feature 216 on the upper portion feature 212 of pivot bolt 208; and generally, the upper portion feature 212 extends into and through aperture feature 116 defined by pivot block 114 such that interior ledge feature 118 of aperture feature 116 rests on pivot height-adjustment nut 214. As will be realized, aperture 116 has a lower radius 130 greater than an upper radius 132 so as to form ledge feature 118. Also, pivot height-adjustment nut 214 can be located so as to be accessible through gap 111 between pivot mount block 114 and pivot cover 202. As noted, the accessibility can be by a flat tool such as a spanner wrench. During adjustment, pivot height-adjustment nut 214 moves upward or downward on pivot bolt 208 by rotation along threaded feature 212.

Figure 10:
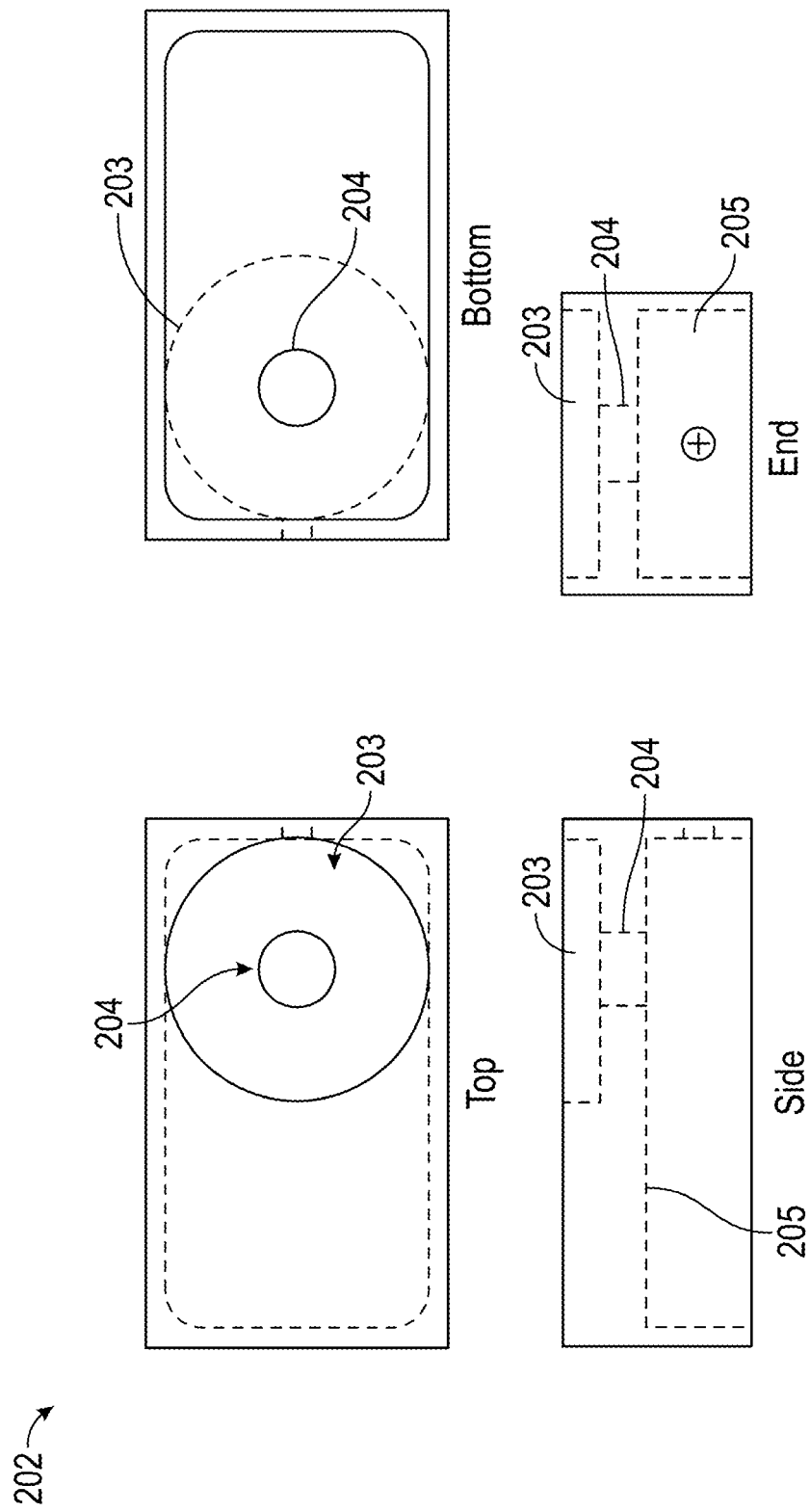
FIG. 10 is an illustration of the pivot cover of FIG. 8 including top, bottom, side and end views.

More details of pivot cover 202 can be seen with reference to FIGS. 6 and 10. Pivot cover 202 has a chamber feature 205 in which pivot floor mount 218 and pivot square nut 224 are located. In this embodiment, chamber feature 205 is connected to recess feature 203 by aperture feature 204. Pivot bolt 208 extends through aperture feature 204 to interact with pivot square nut 224 as described above and below. As noted, a washer (not shown) can be placed within recess feature 203.

Figure 11:
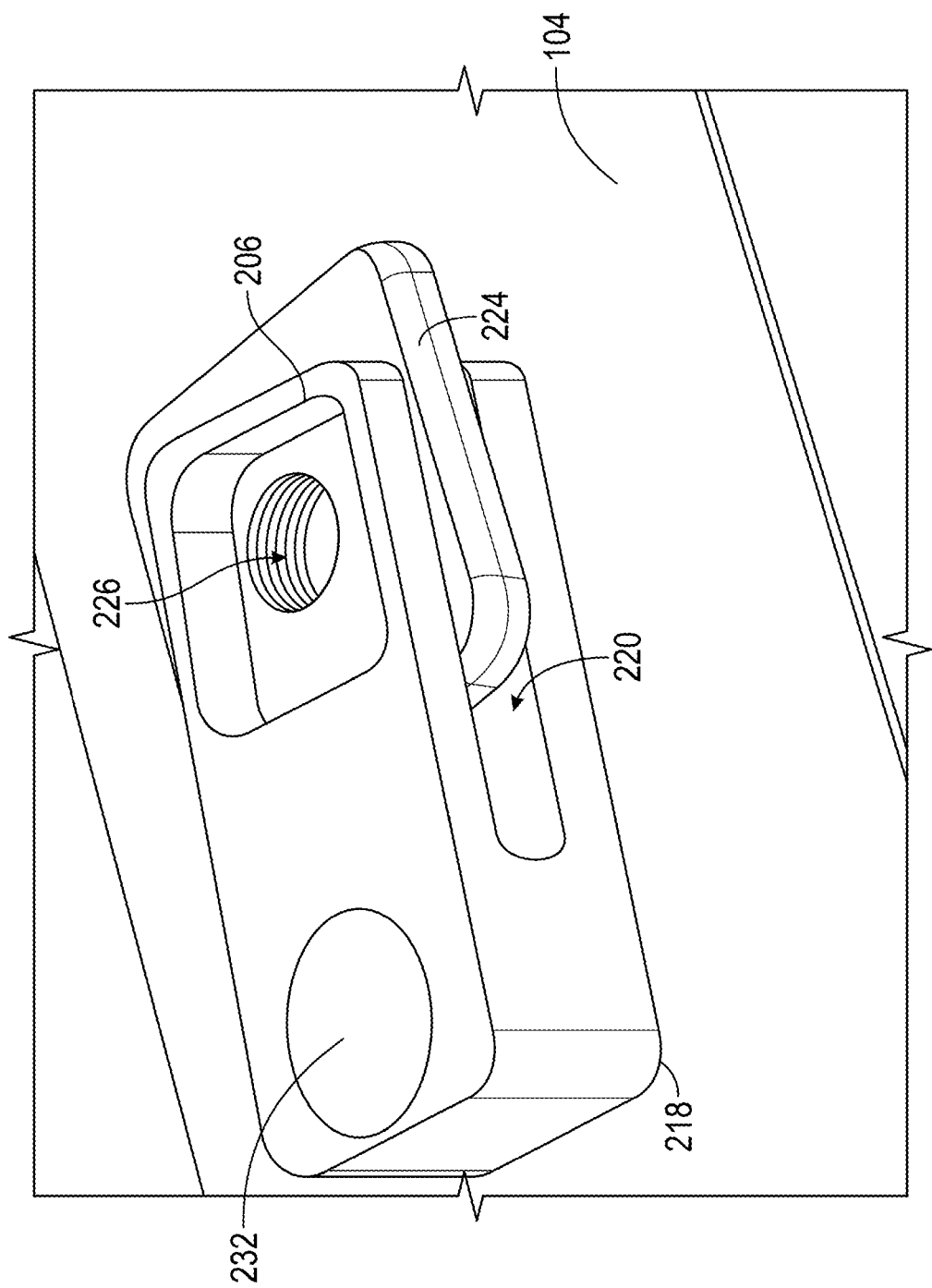
FIG. 11 is an illustration of a pivot floor mount in accordance with the description in this disclosure.
Figure 12:
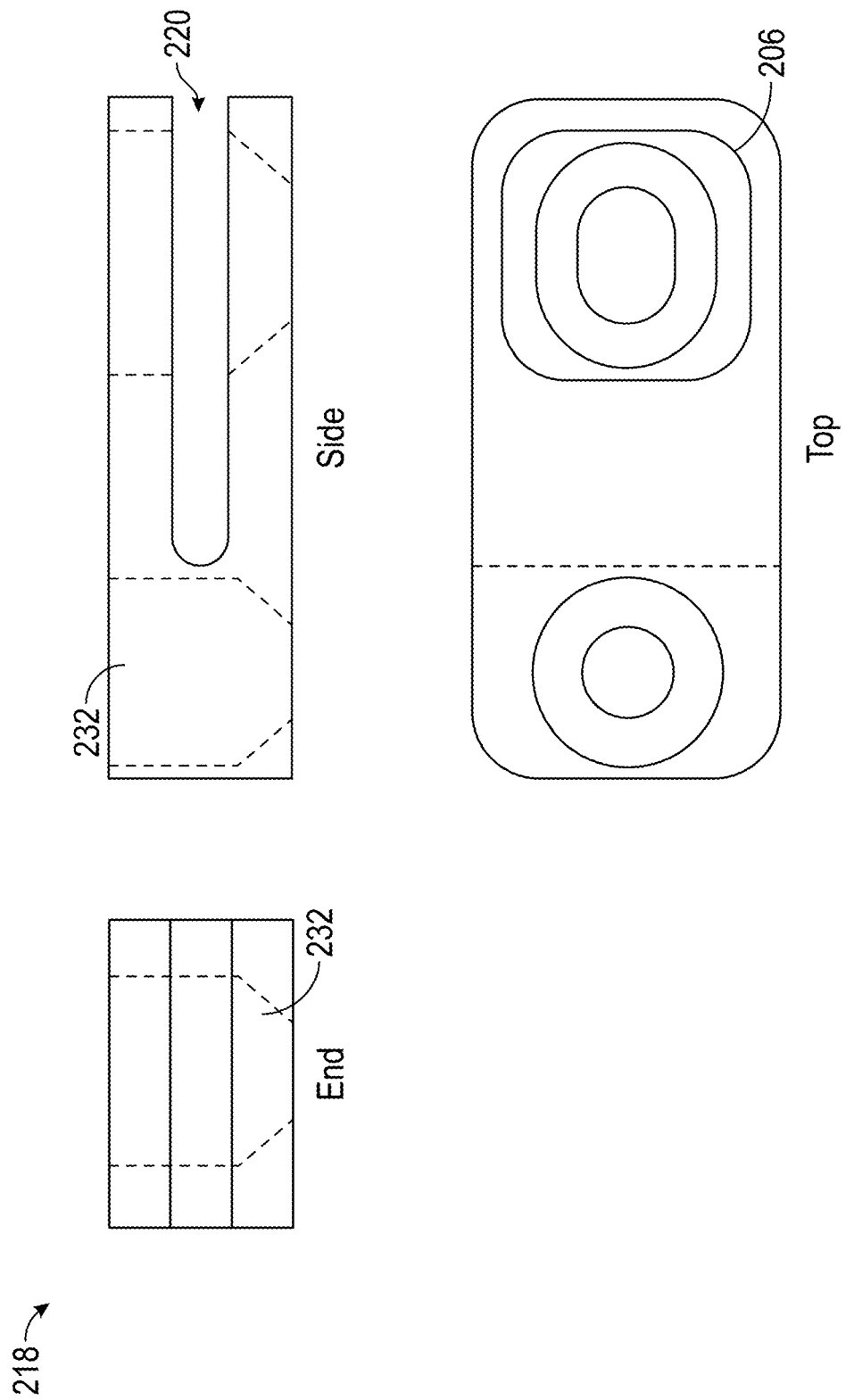
FIG. 12 is an illustration of several views of the pivot floor mount of FIG. 11.
Figure 13:
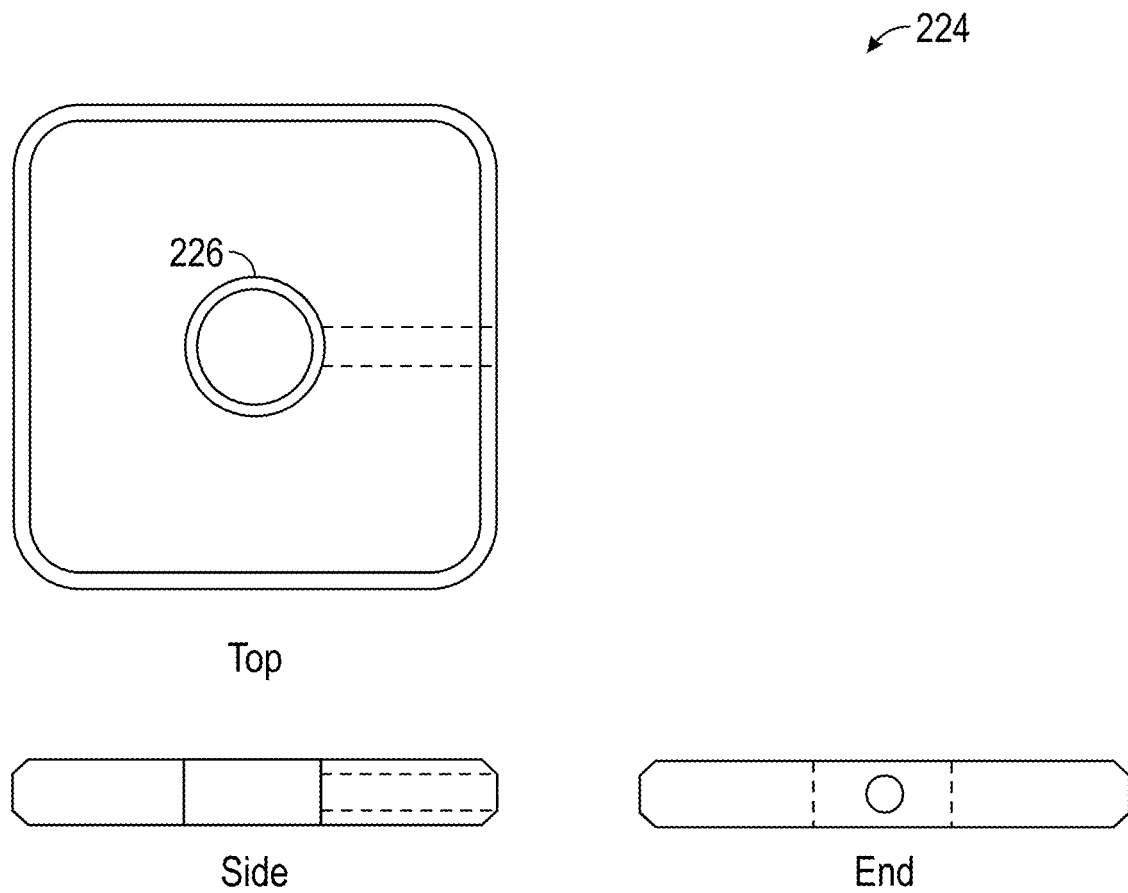
FIG. 13 is an illustration of several views of the pivot square nut of FIG. 11.
Figure 14:
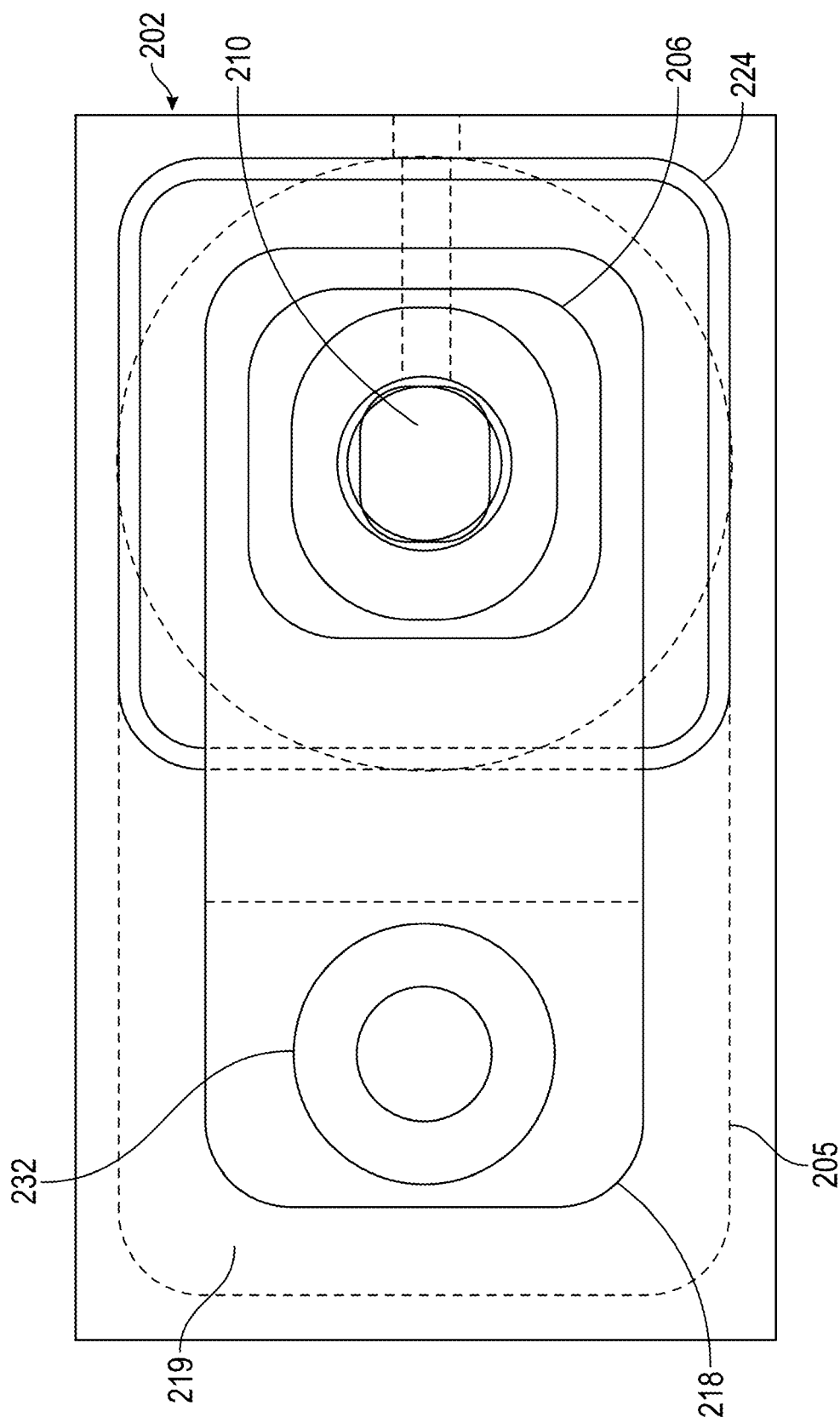
FIG. 14 is drawing illustrating the gap between the pivot floor mount 218 and the pivot cover 202.

Pivot floor mount 218 and pivot square nut 224 can best be seen from FIGS. 11, 12 and 13. Pivot floor mount 218 is designed to be anchored to floor 104, such as by screws or bolts, e.g., via opening 232 and opening 233. As system is scaled more openings and fasteners can be added as is required for the application. Pivot floor mount 218 has a slot feature 220 in which pivot square nut 224 can fit in sliding relation to pivot floor mount 218. Slot feature 220 and pivot square nut 224 are configured so that square nut 224 can slide left and right, and front and back; and thus, impart sliding movement to pivot cover 202, which is in turn imparted to the door 106 through pivot bolt 208 and pivot mount block 114. Additionally, the shape of pivot square nut 224 slides within slot feature 220 and interacts with the shape of pivot cover 202 to provide for a degree of a-axis movement; that is, they are configured to allow rotational movement of pivot cover 202 with respect to floor 104 and pivot floor mount 218 so as to impart rotational movement to the door 106 through pivot bolt 208 and pivot mount block 114.

As will be realized, there will be a gap 219 (see FIG. 14) between the pivot cover 202 and pivot floor mount 218, within chamber 205, and pivot square nut 224 will extend out into this gap 219. The gap 219 should be sized so that pivot cover 202 can move in relation to pivot floor mount 218. Generally, the pivot square nut 224 will extend out from pivot floor mount 218 so that its outer edge is in contact with or adjacent to but slightly spaced away from the inner wall of chamber feature 205. The latter facilitates assembly but the spacing should not be so great as to impede interaction of pivot square nut 224 with the wall of chamber feature 205 in making adjustments.

Gap 219 is variable by nature and is a determinate factor of the range of motion that can be adjusted. Understanding the range of motion and therefore the adjustability on the A, X and Y axes are determined by the gap. For example, the gap 219 can be at least 5% of the width and/or length of chamber feature 205, but can be at least 10% of the width and/or length of chamber feature 205. Typically, the gap 219 will be no more than about 20% of the width and/or length of chamber feature 205, and can be no more than about 15% of the width and/or length of chamber feature 205. Whereas any gap between the pivot square nut 224 and the wall of chamber feature 205 typically is no more than 2% or no more than 1% of the width and/or length of chamber feature 205.

Pivot square nut 224 has a shape to interact with pivot cover 202 as described above. In the illustrated embodiments, the shape is square; however, other shapes can be used as long as it provides for the sliding left and right, front and back, and rotationally as described above. For example, the nut 224 can have a rectangular shape, oval shape or circular shape. As seen in FIGS. 6 & 11, Pivot square nut 224 has a threaded aperture feature 226, and pivot floor mount 218 has an aperture feature 206 which is located at slot feature 220 and aperture feature 204 FIG. 8. As will be realized, aperture feature 206 is above the location of pivot square nut 224. With reference to FIG. 7, the lower portion feature 210 of pivot bolt 208 can extend through aperture feature 204 FIG. 6, and aperture feature 206 so as to extend into slot 220 and engage with aperture feature 226 so as to transfer movement of pivot square nut 224 to the door 106. Aperture feature 226 of pivot square nut 224 is sized to receive pivot bolt 208 such that movement of pivot square nut 224 results in movement of pivot bolt 208 thereby facilitating movement along the X, Y & A axes. Typically, aperture feature 226 is threaded as is the lower portion feature 210 of pivot bolt 208 so that pivot bolt 208 is screwed into pivot square nut 224 as seen in FIG. 11. On the other hand, aperture feature 206 of pivot floor mount 218 should be sized larger than aperture feature 226 of pivot square nut 224 so that pivot floor mount 218 does not impede movement of pivot square nut 224 or pivot bolt 208 in making adjustments.

Referring back to FIGS. 6 and 9, it can be seen that pivot mounting block 114 can comprise a bearing 240 inserted in aperture 116. In certain embodiments, bearing 240 can actually function to support radial, axial and/or thrust loads as required. In other embodiments, bearing 240 can be configured to work in conjunction with a second bearing (not shown) that can, e.g., sit on top of the height-adjustment nut 214 to support radial, axial and/or thrust loads as required. In certain embodiments, the bearing or bearings can be made of bronze and can be cast, making them strong, wear resistant, and excellent at handling shock loads.

As assembly 112 is scaled to support even larger, e.g., doors 106, other bearing materials will likely be required or preferred. As, such the bearing material can, e.g., be stainless steel, bronze, or a bronze alloy such as aluminum-bronze and nickel-tin-bronze, copper alloys, lead free and low-lead alloys, carbon steel, aluminum titanium, cast iron, and engineered plastics.

In certain embodiments, a graphite filled groove on the inside of the bearing 240 can be included and configured to distribute the graphite evenly along the bearing's surface. If working in conjunction with a second bearing as described above, e.g., a thrust bearing, such bearing can include graphite plugs to distribute lubricant along the bearing's surface.

To install the adjustment system 100 the following method can be used. If the frame 110 is not already installed on the glass door 106, then generally this will be done before the door is mounted on to the adjustment system 100. The method described assumes the frame 110 is installed on the glass 108.

In this example the door configuration will define the location of the top pivot point and therefore dictate the placement of the pivot floor mount. Pivot floor mount 218 is first installed to the floor using bolts or screws. A plumb bob can be used to facilitate proper placement of pivot floor mount 218 and is to be centered directly below the top pivot point aligning to the center point of aperture feature 233. Once the pivot floor mount 218 has been installed, the pivot square nut 224 is slid into slot 218 with aperture feature 226 aligned with aperture feature 206 in pivot floor mount 218. (See FIGS. 7, 11 and 14)

With reference to FIGS. 7, 8, 11 and 14, next, pivot cover 202 is placed over pivot floor mount 218 and pivot square nut 224. Preferably, aperture feature 204, aperture feature 206 and aperture feature 226 will be aligned sufficiently for the installation of pivot bolt 208. Pivot bolt 208 is then installed by screwing bottom portion 210 into aperture feature 226 of pivot square nut 224, typically such that pivot disk feature 216 is partially in recess feature 203 of pivot cover 202. At this point, pivot cover 202 can "float" on pivot floor mount 218. In other words, it can move in relation to floor mount 218 and to floor 104 in a forward and backward direction and in a side to side (left and right) direction, and pivot cover 202 can pivot clockwise and counter clockwise in relation to floor mount 218 and to floor 104.

With reference to FIGS. 5, 6 and 7, next the height-adjustment nut 214 is added onto pivot bolt 208 above pivot disk feature 216. Upper portion feature 212 of pivot bolt 208 is threaded so that height-adjustment nut 214 can be screwed onto the upper portion feature 212 of pivot bolt 208. The height-adjustment nut will determine the height of the door by its placement along pivot bolt 208. It can be installed at predetermined height or can be installed at its lowest position and then adjusted after door installation.

Either before or after installation of height-adjustment nut 214, a suitable wrench-type device, such as a side pin spanner wrench, can be used to interact with pivot disk feature 216 so as to downwardly move pivot bolt 208 and thus lock adjustment mounting system 112 such that movement of the pivot cover is prevented. That is, pivot cover 202 does not float on pivot floor mount 218 when adjustment mounting system 112 is locked.

Figure 15:
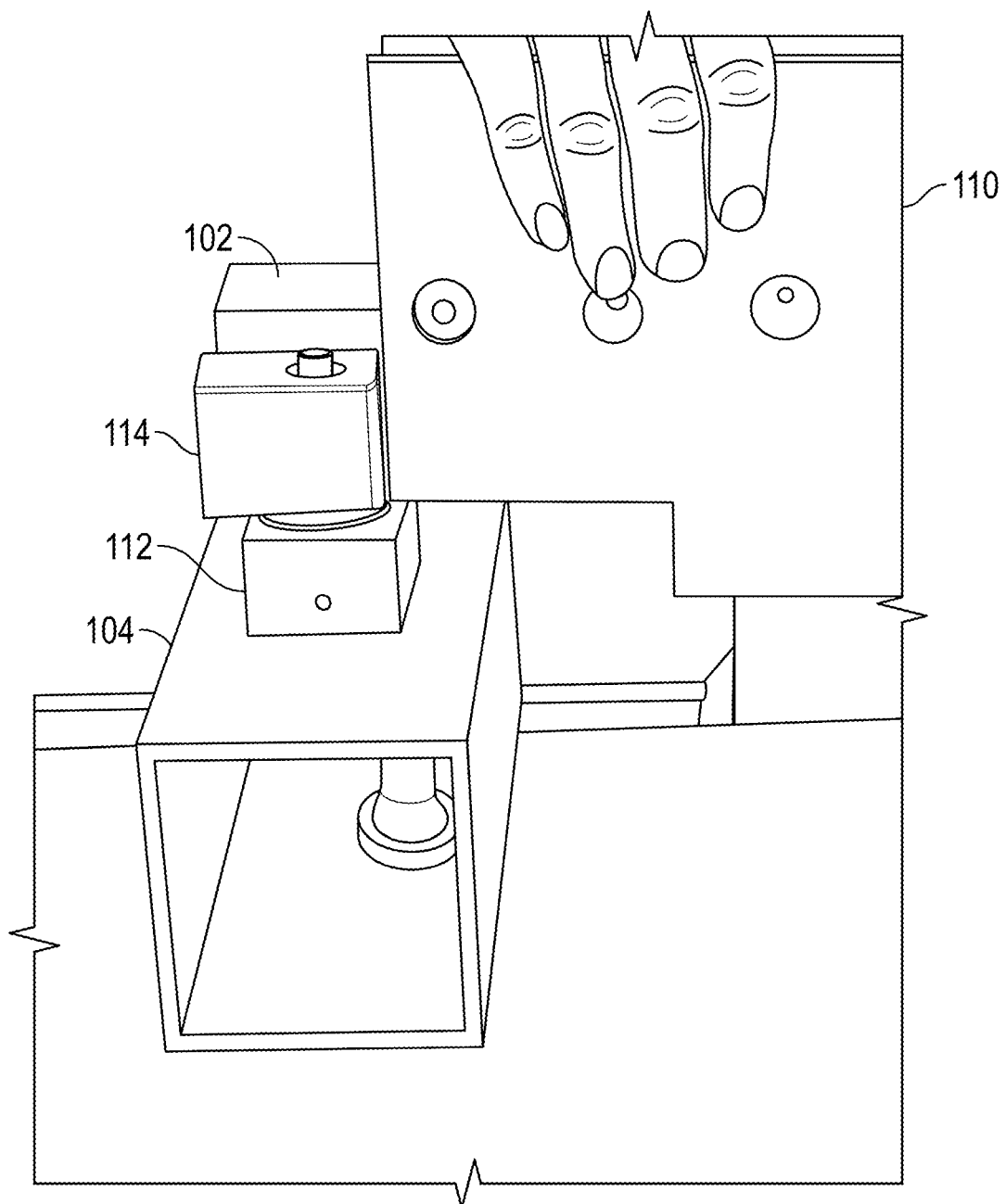
FIGS. 15 and 16 are illustrations of a door frame being mounted on to the adjustment system of this disclosure.
Figure 16:
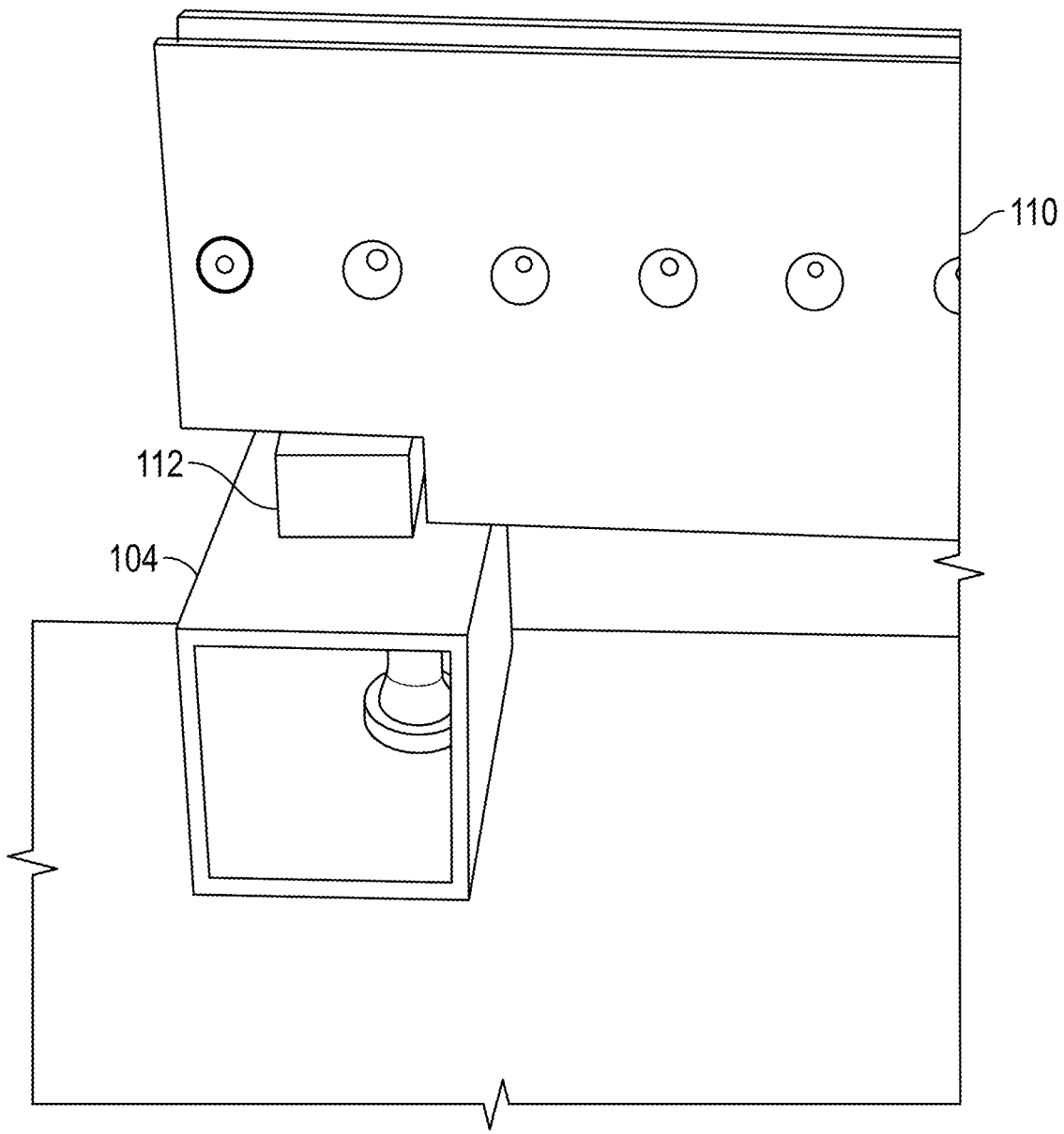

With Reference to FIGS. 2 and 9, next, pivot mount block 114 is placed onto the now assembled adjustment-pivot unit 112. Afterwards door 106 can be mounted by attaching the frame 110 onto pivot mounting block 114. Generally, the pivot mount block will be rotated to the open position to facilitate attaching of the door (See FIGS. 15 and 16).

Figure 17:
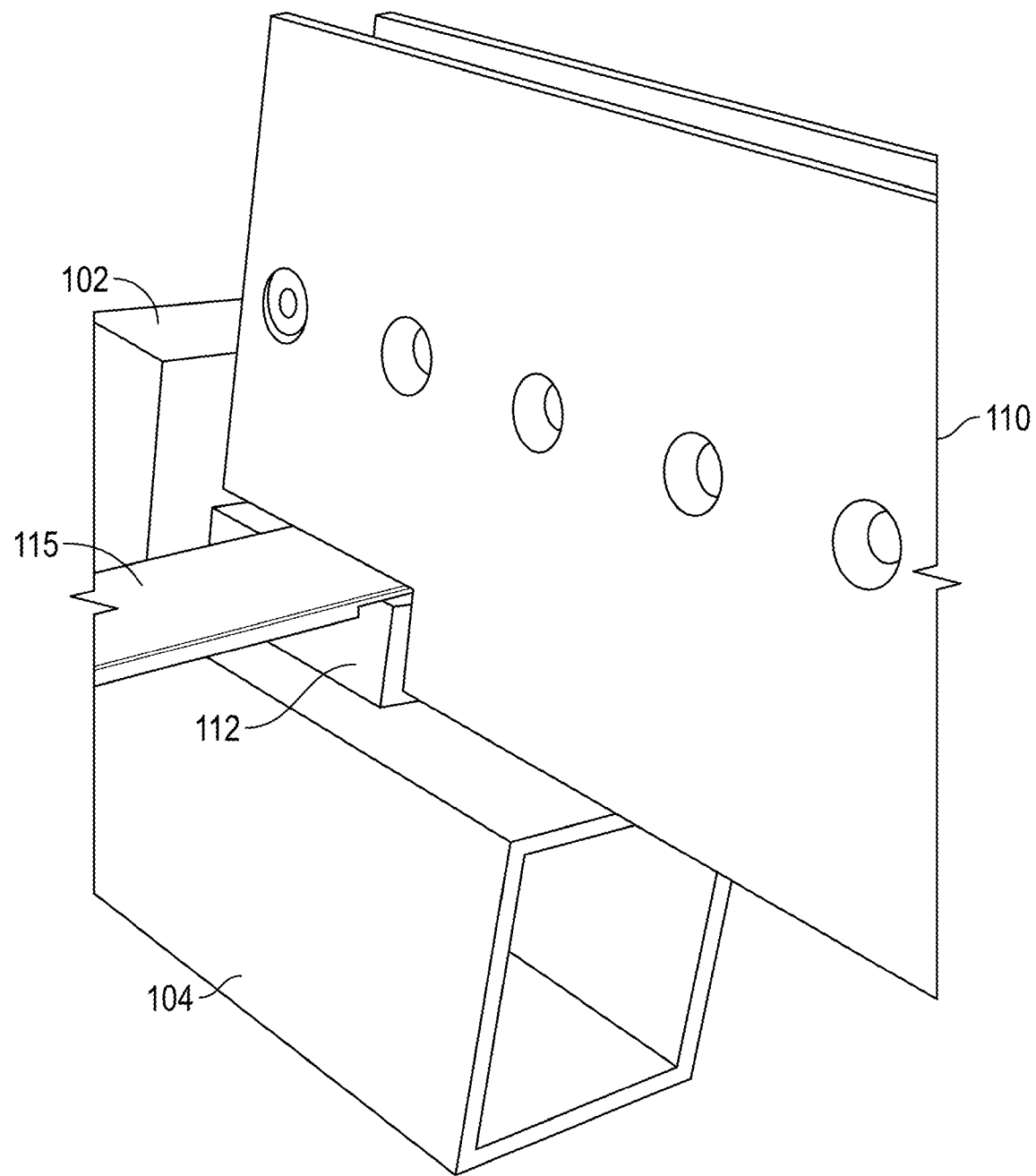
FIG. 17 shows insertion of a spanner wrench for adjustment of a door.
Figure 18:
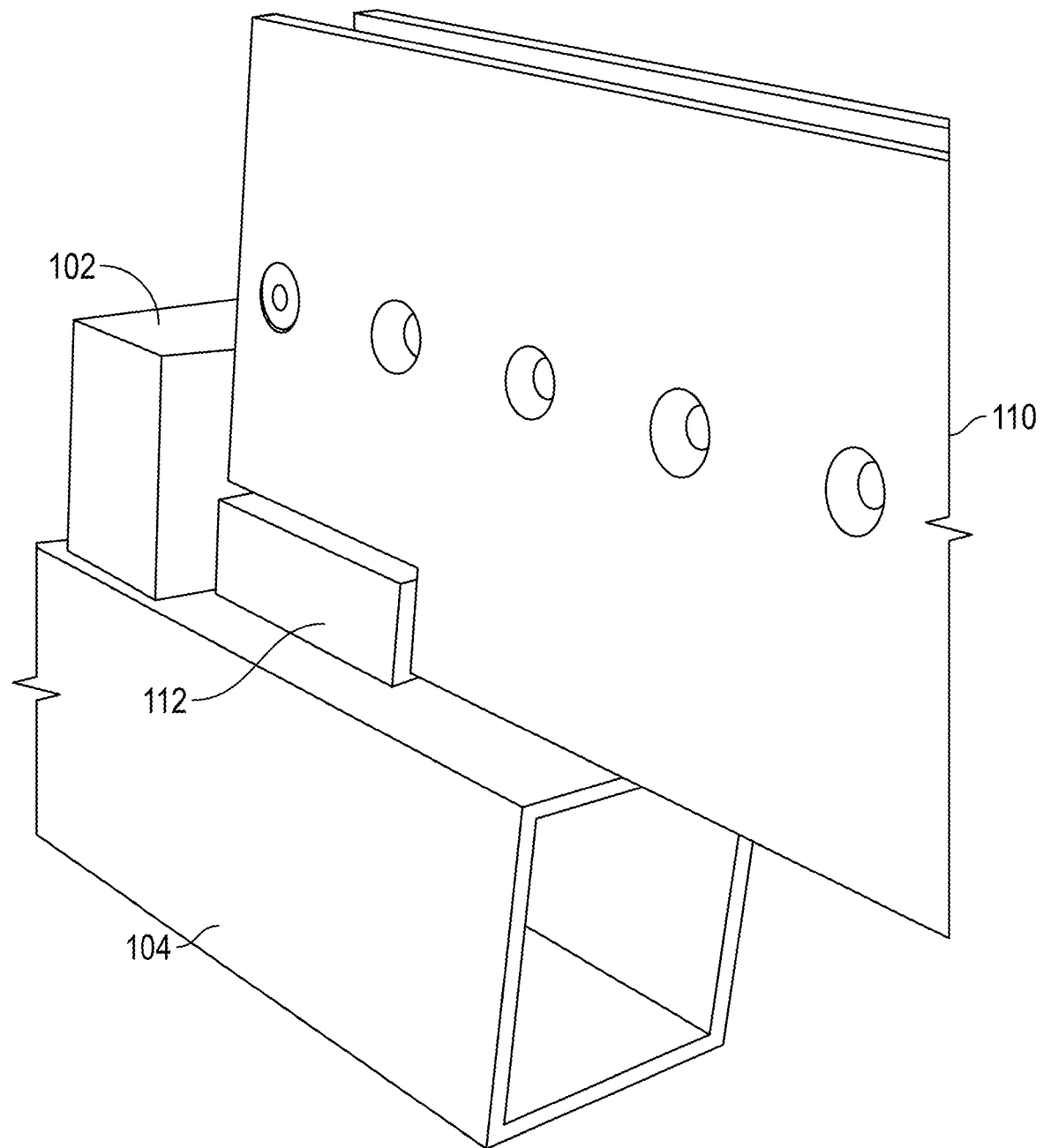
FIG. 18 shows the position of the pivot cover after rotational adjustment.
Figure 19:
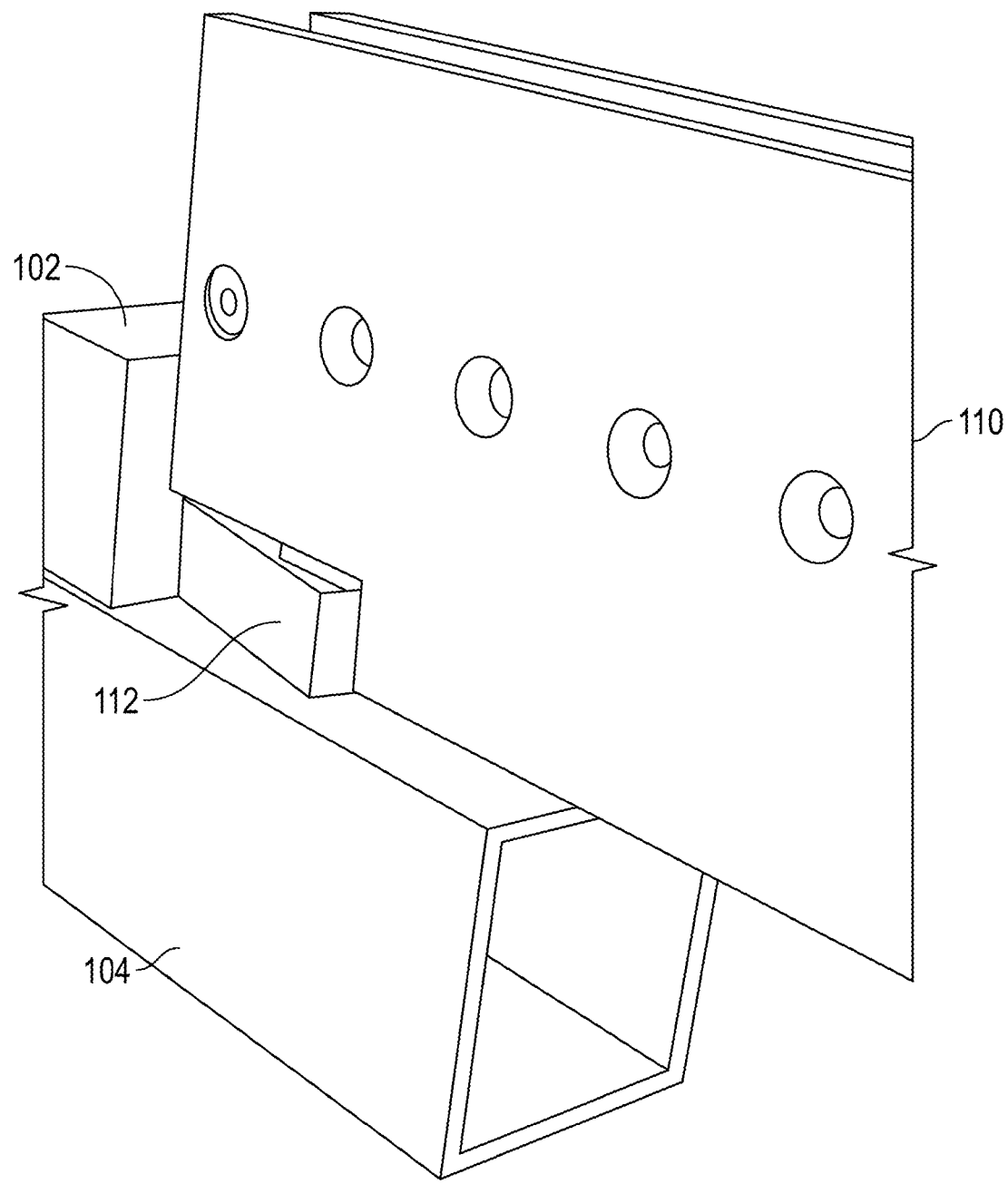
FIG. 19 shows the position of the pivot cover before a rotational adjustment.

As seen in FIGS. 6 and 17 when adjustments need to be made to orientation, an appropriate flat tool, such as a side pin spanner wrench 115, can be inserted into gap 111 to interact with pivot disk feature 216 and move pivot bolt 208 upward so as to unlock adjustment mounting system 112 and allow pivot cover 202 to float on pivot floor mount 218 as discussed above. This allows the door to be adjusted in backward, forward, left and right directions and to pivot about the a-axis. FIG. 17 shows insertion of a side pin spanner wrench 115. FIG. 18 shows the position of pivot cover 202 after rotational adjustment, and FIG. 19 shows the position of pivot cover 202 before a rotational adjustment. After adjustments are made the tool can be used to lock adjustment mounting system 112 from further movement.

When adjustments to the height of the door need to be made, an appropriate flat tool, such as a spanner wrench, can be inserted into gap 111 to interact with pivot height-adjustment nut 214. Generally, the tool for height adjustment will be a different size than the tool for orientational adjustment. By this means, pivot height-adjustment nut 214 is moved upward or downward on pivot bolt 208, which correspondingly moves pivot mount 114 upward and downward and thus also door 106.

From the above disclosure, various advantages and benefits of the present adjustment system will be readily apparent. Among these are that the system is not limited to large weighty mounted structures but is readily scalable for use with mounted structures of all sizes and weights. While useable with a wide variety of mounted structures, the system is beneficial in allowing adjustments to mounted structures in an easy and economical manner where the configuration, size and/or weight of the mounted structures normally makes adjustments expensive and time consuming or even where adjustments have been prohibitively expensive and difficult in the past.

Therefore, the present systems and methods are well adapted to attain the ends and advantages mentioned, as well as those that are inherent therein. The systems and methods may be modified and practiced in different but equivalent manners apparent to those skilled in the art having the benefit of the teachings herein. Furthermore, no limitations are intended to be the details of construction or design herein shown, other than as described in the claims below. It is therefore evident that the particular illustrative examples disclosed above may be altered or modified, and all such variations are considered within the scope and spirit of the present treatment additives and methods. While compositions and methods are described in terms of "comprising," "containing," "having," or "including" various components or steps, the compositions and methods can also, in some examples, "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b" inclusive of single values) disclosed herein is to be understood to set forth every number and range encompassed within the broader range of values. Also, the terms in the claims have their plain, ordinary meaning unless otherwise explicitly and clearly defined by the patentee.

What is claimed is:

1. An adjustment system comprising:
   a pivot bolt having a threaded lower portion;
   a pivot nut comprising a threaded pivot nut aperture feature configured to accept the lower portion of the pivot bolt;
   a floor mount having a slot in which the pivot nut is slidingly engaged so as to be movable in a forward-backward, side-to-side and rotational direction, the floor mount having a floor mount aperture that aligns with the pivot nut aperture;
   a cover configured to mount over the floor mount and engage with the pivot nut so as to move with the pivot nut;
   wherein the lower portion of the pivot bolt is adjustably connected to the pivot nut and wherein the pivot bolt is configured to be adjusted between a first position which allows movement of the pivot nut with respect to the floor mount and a second position wherein movement of the pivot nut with respect to the floor mount is prevented.

2. The adjustment system of claim 1, wherein the pivot nut is square shape, rectangular shape, oval shape or circular shape.

3. The adjustment system of claim 1, wherein the cover comprises a chamber in which the floor mount and pivot nut are located, the chamber forms a gap between the floor mount and walls of the chamber so the cover is adapted to move with respect to the floor mount.

4. The adjustment system of claim 3, wherein the chamber is constructed such that the gap is configured to allow the pivot nut to move in the forward-backward, side-to-side and rotational direction.

5. The adjustment system of claim 3, wherein the pivot nut aperture is sized to receive the lower portion of the pivot bolt such that movement of the pivot nut results in movement of the pivot bolt.

6. The adjustment system of claim 5, wherein the floor mount aperture is sized larger than the pivot nut aperture so that the floor mount aperture does not impede movement of the pivot nut and pivot bolt.

7. The adjustment system of claim 3, wherein the gap is at least 5% of a width and/or length of the chamber.

8. The adjustment system of claim 3, wherein the gap is at least 10% of a width and/or length of the chamber.

9. The adjustment system of claim 3, wherein the gap is no more than 20% of a width and/or length of the chamber.

10. The adjustment system of claim 3, wherein the gap is no more than 15% of a width and/or length of the chamber.

11. The adjustment system of claim 3, wherein the gap is no more than 2% of a width and/or length of the chamber.

12. The adjustment system of claim 3, wherein the gap is no more than 1% of a width and/or length of the chamber.

* * * * *